No. 691,703. Patented Jan. 21, 1902.
A. C. HUCKSTEPP.
ADVERTISING DEVICE.
(Application filed Sept. 3, 1901.)
(No Model.) 2 Sheets—Sheet 1.

WITNESSES
INVENTOR Arthur C. Huckstepp
By James L. Norris
Atty

No. 691,703. Patented Jan. 21, 1902.
A. C. HUCKSTEPP.
ADVERTISING DEVICE.
(Application filed Sept. 3, 1901.)
(No Model.) 2 Sheets—Sheet 2.

WITNESSES
INVENTOR Arthur C. Huckstepp
By James L. Norris
Atty.

UNITED STATES PATENT OFFICE.

ARTHUR CHARLES HUCKSTEPP, OF BIRMINGHAM, ENGLAND.

ADVERTISING DEVICE.

SPECIFICATION forming part of Letters Patent No. 691,703, dated January 21, 1902.

Application filed September 3, 1901. Serial No. 74,211. (No model.)

*To all whom it may concern:*

Be it known that I, ARTHUR CHARLES HUCKSTEPP, advertising manager, a subject of the King of Great Britain, residing at 24 Bournbrook road, Birmingham, England, have invented a certain new and useful Advertising Device, of which the following is a specification.

This invention has reference to advertising devices or means for displaying or bringing prominently or aggressively to notice various advertisements, announcements, and other printed or pictorial matter.

As applied for advertising purposes the means or device which forms the subject of my invention is primarily intended to be inclosed within an envelop or similar cover, either alone or together with a letter, circular, or other communication, and is so constructed that on the envelop being opened an advertising announcement, picture, or the like is automatically projected from the envelop, and thus brought prominently to the notice of the person opening the envelop.

Figure 1:
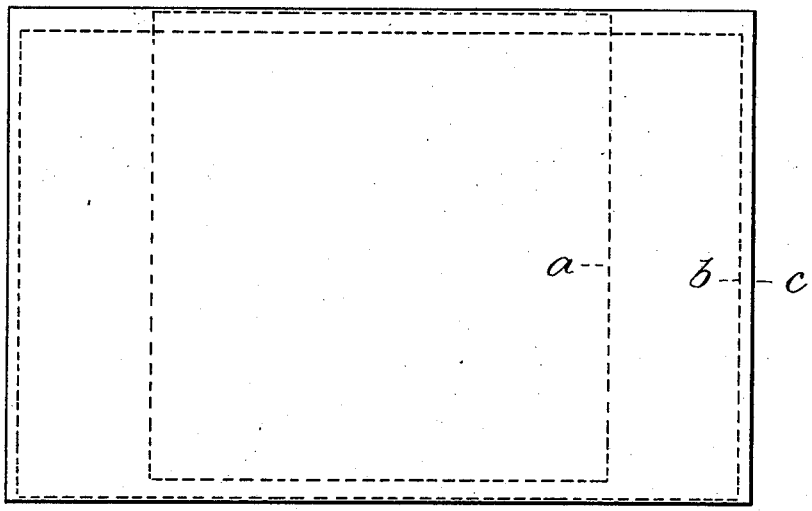
Figure 2:
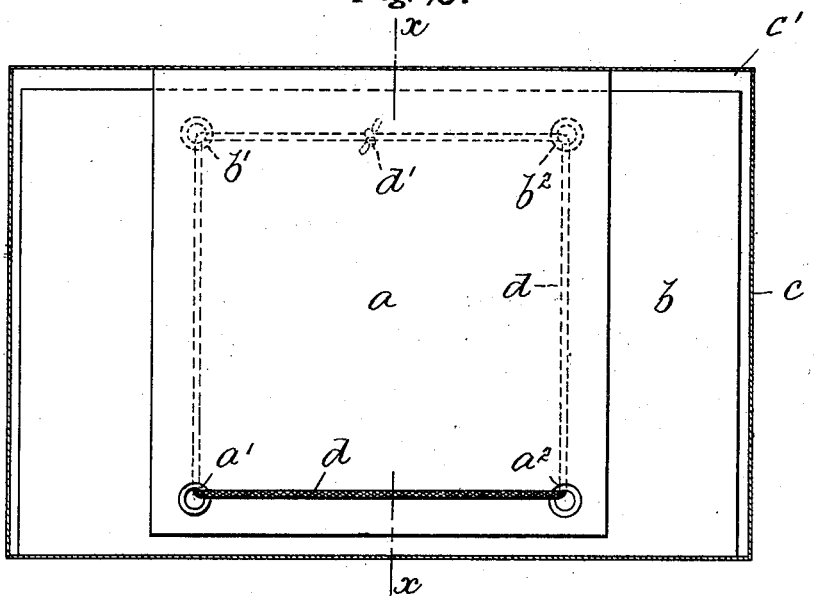
Figure 3:
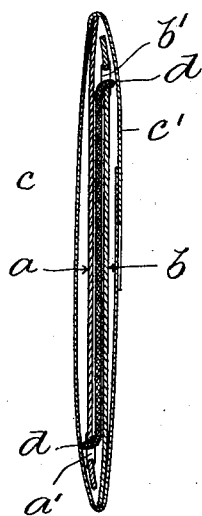
Figure 5:
Figure 4:
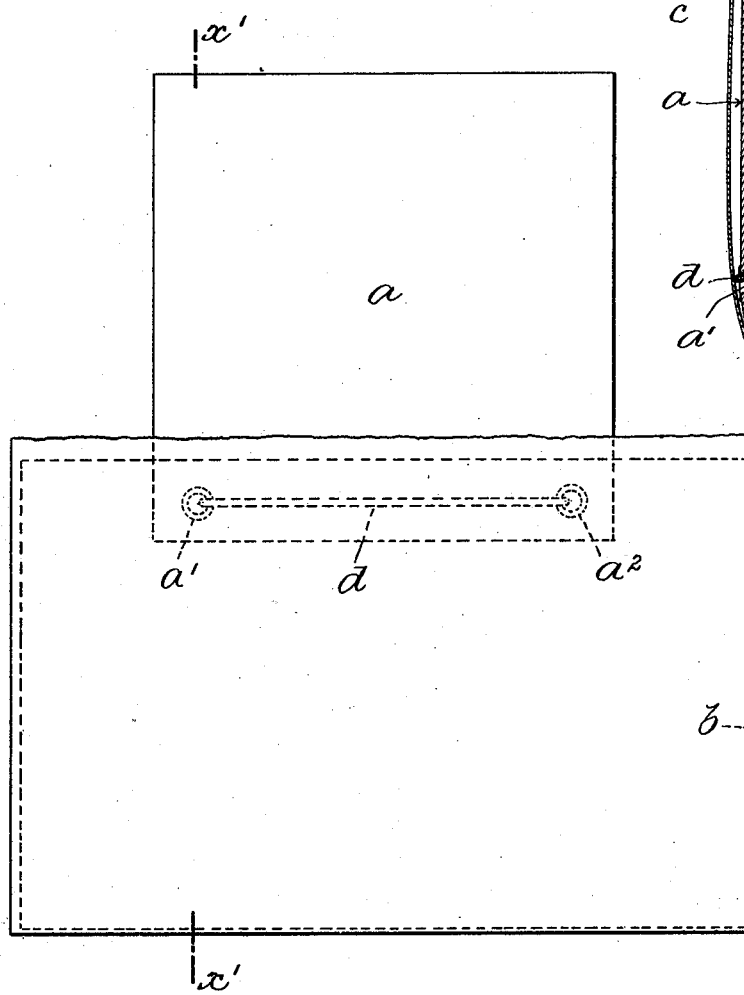

Figure 1 of the accompanying drawings represents a postal envelop or inclosure containing an advertising device constructed according to my invention. The position assumed by said device when the envelop is sealed is shown in dotted lines. Fig. 2 is a view showing the envelop in section and the advertising device in elevation, showing the several parts in the positions they assume when the envelop is closed. Fig. 3 is a cross-section of Fig. 2 upon the dotted line $x$. Fig. 4 is an elevation showing how that part of the device which bears the advertisement is projected from the envelop when the latter is opened. Fig. 5 is a cross-section of Fig. 4 upon the dotted line $x'$.

The same letters of reference indicate corresponding parts in the several figures of the drawings.

The device consists of two principal parts—viz., a card or tablet $a$ of suitable dimensions, upon which the advertisement or the like is printed or affixed, and a second card, tablet, or the like $b$, adapted to constitute a carrier for the advertisement-tablet and made, preferably, of a size which will fit fairly tight inside the envelop or cover $c$, wherein the device is to be inclosed. At or near the bottom corners of the advertisement-tablet two eyeleted holes $a'$ $a^2$ are formed, and two corresponding holes $b'$ $b^2$ are formed near the top edge $b^3$ of the carrier-card, and through these holes a length of elastic or distensible cord $d$ is laced and its ends tied at $d'$, the arrangement being such that the two cards $a$ and $b$ are connected by an elastic or distensible loop formed by the threaded-through elastic cord $d$.

In use the carrier-card $b$ is placed into the envelop, and then the advertising-tablet is pushed down, so as to also lie inside the envelop, as shown in Figs. 1, 2, and 3, and in front of its carrier, the connection-loop $d$ being thereby stretched or tensioned into the form shown in Fig. 2. The flap $c'$ of the envelop $c$ is then sealed down in the ordinary way, so as to inclose the device either alone or with a letter or other postal matter, and on being opened by the addressee, who cuts or tears the envelop along the top edge in the usual way, the reaction of the distended elastic loop or spring projects the advertising-card out of the envelop, as shown in Figs. 4 and 5, thus bringing the advertisement upon it prominently and unexpectedly to notice and in an aggressive or forcible manner, that insures it being seen and read by the person to whom the envelop is addressed.

Having fully described my invention, what I desire to claim and secure by Letters Patent is—

An advertising device consisting of a carrier-card having a pair of openings near the top edge thereof, a card provided with a pair of openings near the bottom edge thereof, and an elastic means extending through the openings of the cards for suitably connecting them together.

In testimony whereof I have hereunto set my hand in presence of two subscribing witnesses.

ARTHUR CHARLES HUCKSTEPP.

Witnesses:
 ARTHUR THOMAS SADLER,
 GAVIN RALSTON.